United States Patent
del Gaizo et al.

(10) Patent No.: US 8,926,000 B2
(45) Date of Patent: Jan. 6, 2015

(54) FRONT DIFFUSER FOR A MOTOR VEHICLE

(71) Applicant: Dr. Ing. h.c.F. Porsche Aktiengesellschaft, Stuttgart (DE)

(72) Inventors: Christian del Gaizo, Stuttgart (DE); Klaus Lutz, Wiernsheim (DE); Norbert Schwan, Rutesheim (DE); Henning Witte, Ettlingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/851,526

(22) Filed: Mar. 27, 2013

(65) Prior Publication Data
US 2013/0257093 A1    Oct. 3, 2013

(30) Foreign Application Priority Data
Mar. 28, 2012   (DE) .......................... 10 2012 102 668

(51) Int. Cl.
*B62D 35/02*    (2006.01)
*B62D 37/02*    (2006.01)

(52) U.S. Cl.
CPC ................ *B62D 35/02* (2013.01); *B62D 37/02* (2013.01)
USPC .................................................... 296/180.5

(58) Field of Classification Search
CPC .............................. B62D 35/005; B62D 37/02
USPC .............................. 296/180.1–180.5; 180/903
See application file for complete search history.

(56) References Cited

U.S. PATENT DOCUMENTS

| 4,119,339 | A | * | 10/1978 | Heimburger | 296/180.5 |
| 4,489,806 | A | * | 12/1984 | Shimomura | 180/313 |
| 4,558,897 | A | * | 12/1985 | Okuyama et al. | 296/180.5 |
| 4,810,022 | A | | 3/1989 | Takagi et al. | |
| 5,322,340 | A | * | 6/1994 | Sato et al. | 296/180.1 |
| 6,033,010 | A | * | 3/2000 | Preiss | 296/180.1 |
| 6,196,620 | B1 | * | 3/2001 | Haraway, Jr. | 296/180.5 |

(Continued)

FOREIGN PATENT DOCUMENTS

| DE | 35 12 378 | 10/1985 |
| DE | 601 01 363 | 10/2004 |

OTHER PUBLICATIONS

German Search Report of Dec. 14, 2012.

*Primary Examiner* — H Gutman
(74) *Attorney, Agent, or Firm* — Gerald E. Hespos; Michael J. Porco; Matthew T. Hespos

(57) ABSTRACT

Front diffusers are provided on a front underbody covering of a vehicle, in a manner lying laterally on the inside next to the two front wheel houses. Each front diffuser has a longitudinally directed air duct integrated into the front underbody covering and has a pivotable flap. The flap is connected to an actuating device that can be actuated by a switch in the passenger compartment for shifting the device between a first position flush with the outer skin and a second upwardly pivoted position. The second, upwardly pivoted position of the front diffuser or of the flap produces an increase in downforce at the front axle.

14 Claims, 3 Drawing Sheets

(56) References Cited

U.S. PATENT DOCUMENTS

| | | | |
|---|---|---|---|
| 6,575,522 B2* | 6/2003 | Borghi et al. | 296/180.5 |
| 6,953,218 B2* | 10/2005 | Jungert | 296/180.1 |
| 7,040,690 B2* | 5/2006 | Soja et al. | 296/180.5 |
| 7,661,753 B2* | 2/2010 | Shinedling et al. | 296/180.5 |
| 7,686,383 B2* | 3/2010 | Tortosa-Boonacker | 296/180.1 |
| 7,887,119 B2* | 2/2011 | Ramsay | 296/180.1 |
| 2009/0115221 A1* | 5/2009 | Shinedling et al. | 296/180.5 |
| 2010/0052361 A1* | 3/2010 | Tortosa-Boonacker | 296/180.1 |
| 2011/0095563 A1* | 4/2011 | Andersen | 296/180.1 |
| 2013/0168999 A1* | 7/2013 | Hitchcock | 296/180.1 |

* cited by examiner

FRONT DIFFUSER FOR A MOTOR VEHICLE

CROSS REFERENCE TO RELATED APPLICATION

This application claims priority under 35 USC 119 to German Patent Appl. No. 10 2012 102 668.8 filed on Mar. 28, 2012, the entire disclosure of which is incorporated herein by reference.

BACKGROUND OF THE INVENTION

1. Field of the Invention

The invention relates to a front diffuser that is arranged in a front underbody covering of a motor vehicle.

2. Description of the Related Art

DE 601 01 363 T2 discloses a vehicle with movable guiding surfaces that are formed by flat extensions. Each extension is coupled to the vehicle floor in a manner to articulate about an axis of rotation. More particularly, each extension is adjustable between a position co-planar with the floor and a inclined at an angle with respect to the floor.

It is the object of the invention to provide a front diffuser for a motor vehicle that contributes to an improved coefficient of drag and generates a downforce via a device in the underbody covering.

SUMMARY OF THE INVENTION

The invention relates to a front diffuser that has adjustable flaps and that is into the underbody covering. The front diffuser reduces the coefficient of drag and enables an increased downforce value to be achieved at the front end of the vehicle and improves driving stability. More particularly, the front diffuser comprises flaps that are pivotable into two end positions and are arranged between two boundary walls of an air duct in the underbody covering. A transversely oriented pivot axis located at the front enables the flaps to pivot between a lower end position where the flap is pivoted down in the air duct and runs in a horizontal plane and an upper end position where the flap is pivoted up in the air duct and runs in an oblique plane.

The actuating drive is arranged and held on the underbody covering and has a linear drive that comprises a toggle lever arrangement that can be activated by an actuator. The toggle lever arrangement has an upright lever that is connected in an articulated manner to an actuating rod of the actuator in the upwardly pivoted end position of the actuating drive, and further has a downwardly oriented lever that is connected in an articulated manner to an actuating lever coupled to the flap of the front diffuser.

The actuating drive is actuable from the interior of the vehicle by an actuating switch. This arrangement and design of the flaps of the front diffuser and the activation of the front diffuser via the actuating drive enables the flaps to be positioned optimally according to the driving state for obtaining a small coefficient of drag and an optimized downforce value at the vehicle.

To achieve the optimized downforce value, the flaps of the front diffuser are arranged parallel to each other in the air duct in the underbody covering adjacent to a front wheel of the vehicle. The air duct has a front inlet opening in the region of a front spoiler and a transversely oriented outlet opening to a wheel house of the vehicle. This arrangement of the front diffuser achieves a distribution of pressure at the underbody of the vehicle and therefore the optimum downforce value.

The air duct preferably is integrated in a front underbody covering of the vehicle. An outer boundary wall of the air duct runs rectilinearly in the longitudinal direction of the vehicle and an inner boundary wall of the air duct runs in a curved manner on the end side. One end of the outer rectilinear boundary wall forms the outlet opening of the air duct toward the wheel house.

When the flap is pivoted up, the air duct with the delimitations thereof on both sides via the boundary walls and the pivotable flap arranged in between results in forcibly guided air conduction via the air duct into the wheel arch and therefore results in a downforce pressure. The downwardly pivoted front diffuser flap has an outflow surface that is level with the underbody covering and produces a favorable coefficient of drag. The integration of the air duct into the underbody covering means that no additional attachments are needed to form the air duct.

The pivotable flap of the front diffuser preferably is of thin-walled design and is composed of an asbestos fiber reinforced plastics material or a carbon fiber reinforced plastics material. A front end of the pivotable flap, as seen in the direction of travel, is connected to the underbody covering by a bolted connection that defines the pivot axis for adjusting the flap up and down. The bolted connection of the thin-walled flap to the underbody covering enables the flap to bend up so that the front region of the flap is bent down approximately in a curved manner and the rear region defines an approximately rectilinear surface.

An exemplary embodiment of the invention is illustrated in the drawings and is described in more detail below.

DETAILED DESCRIPTION OF THE PREFERRED EMBODIMENTS

Figure 1:
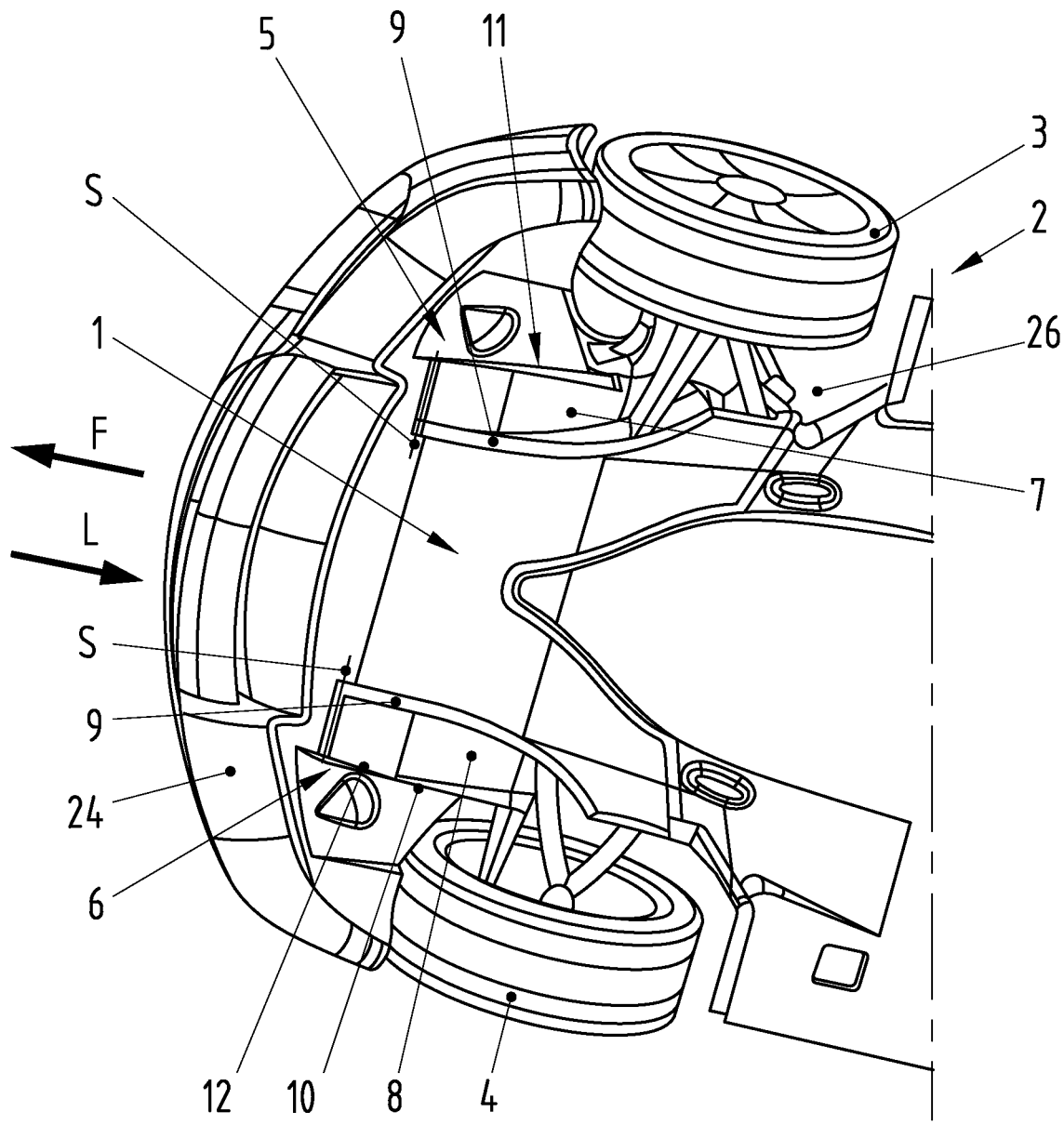
FIG. 1 is a bottom view of a front end of a motor vehicle, with front diffusers comprising flaps arranged in the vicinity of the front wheels.
Figure 2:
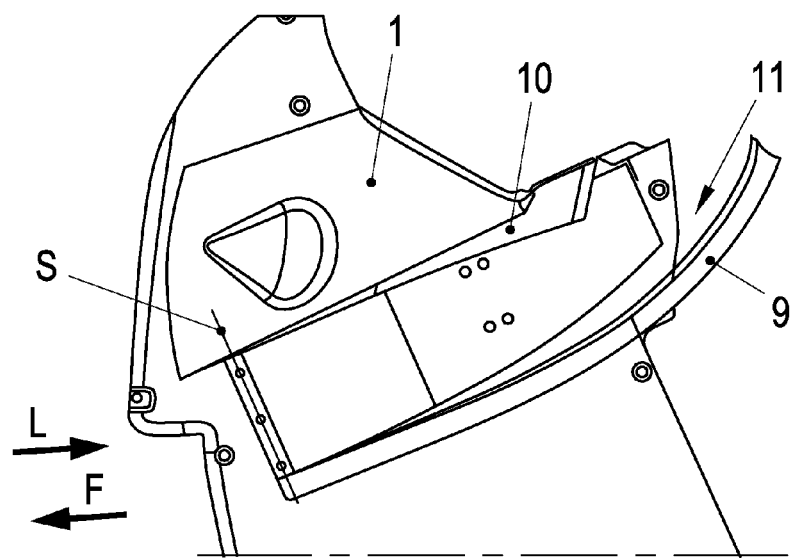
FIG. 2 is a bottom view of a front diffuser flap arranged in an air duct in the underbody covering.
Figure 3:
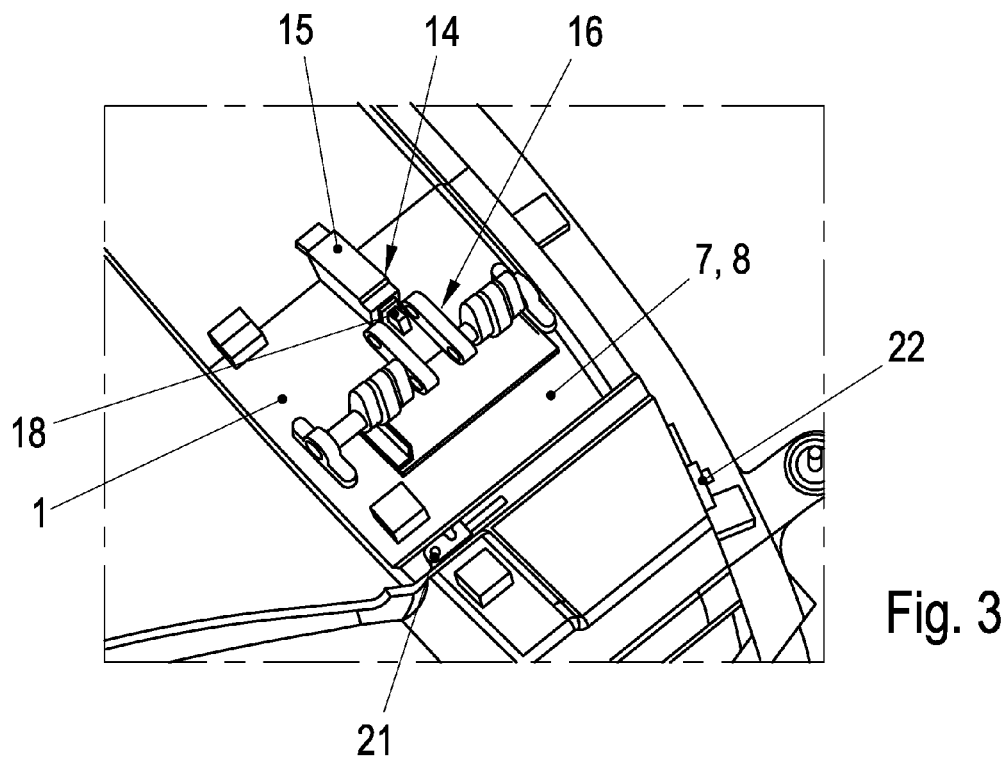
FIG. 3 is a view of an actuating drive for the flap of the front diffuser.

An underbody covering 1 of a motor vehicle 2 has two front diffusers 5, 6 arranged in the vicinity of the front wheels 3, 4. The front diffusers comprise pivotable flaps 7, 8 that are arranged between boundary walls 9, 10 of air ducts 11, 12. The flaps 7, 8 and the associated air ducts 11, 12 preferably extend in the longitudinal direction of the vehicle. An actuating drive 14 pivots the flaps 7, 8 about a transversely oriented pivot axis S located at the front (as seen in the direction of travel F) between a lower end position I, which is pivoted down in the air duct 11, 12 to define a horizontal plane x-x, and an upper end position II, which is pivoted up in the air duct 11, 12 to define an oblique plane y-y.

Figure 5:
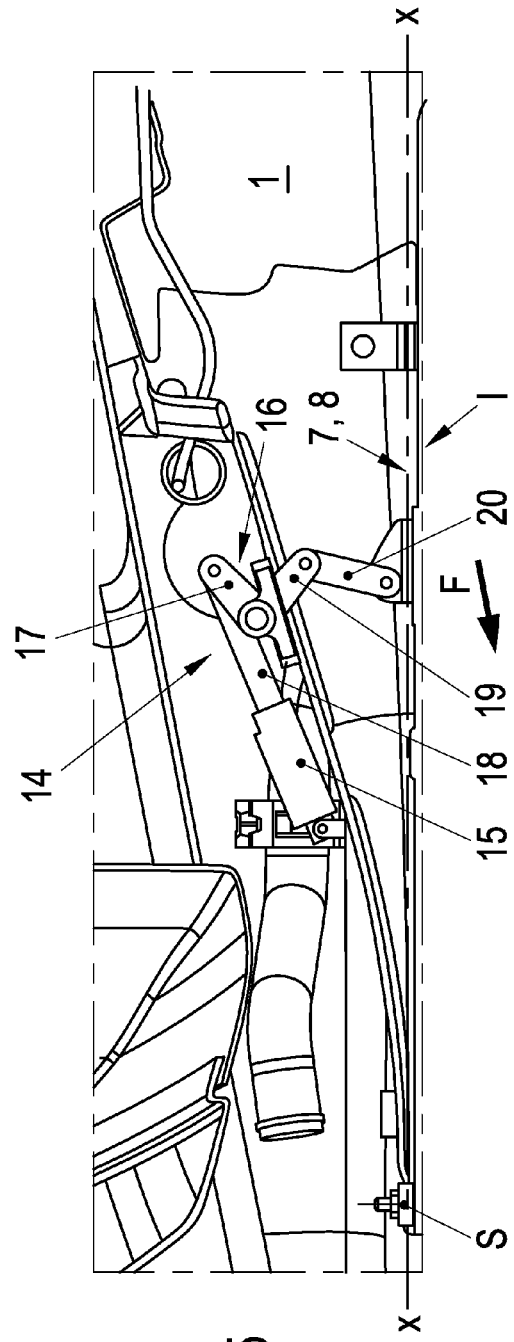
FIG. 5 is a side view according to FIG. 4 of the flap of the front diffuser in a downwardly pivoted, horizontal end position.

The acutating drive 14 is connected to the underbody covering 1 and preferably has a linear drive that comprises a toggle lever arrangement 16 activatable via an actuator 15. An upright lever 17 of the toggle lever arrangement 16 is connected in an articulated manner to an actuating rod 18 of the actuator 15, and a further, downwardly oriented lever 19 is connected in an articulated manner to the flap 7, 8 of the front diffuser 5, 6 via an actuating lever 20. The position of the toggle lever arrangement 16 in FIG. 5 refers to the lower end position I. In the upper end position II the levers and the actuating rod are pivoted in accordance with the adjustment movement of the toggle lever.

An actuating switch in the interior of the vehicle 2 is used to actuate the actuating drive 14 and the positions I and II of the flaps 7, 8 can be ascertained via sensors 21, 22.

As illustrated in FIG. 1, the flaps 7, 8 of the front diffuser 5, 6 are arranged in the air ducts 11, 12 directly next to the front wheels 3, 4 of the vehicle 2. The air ducts 11, 12 run parallel to each other and at a distance. Each air duct 11, 12 has a front inlet opening 23 in the region of a front spoiler 24 and an outlet opening 25 that is oriented transversely with respect to the vehicle 2, for an air flow L to a wheel house 26 of the vehicle 2.

Figure 4:
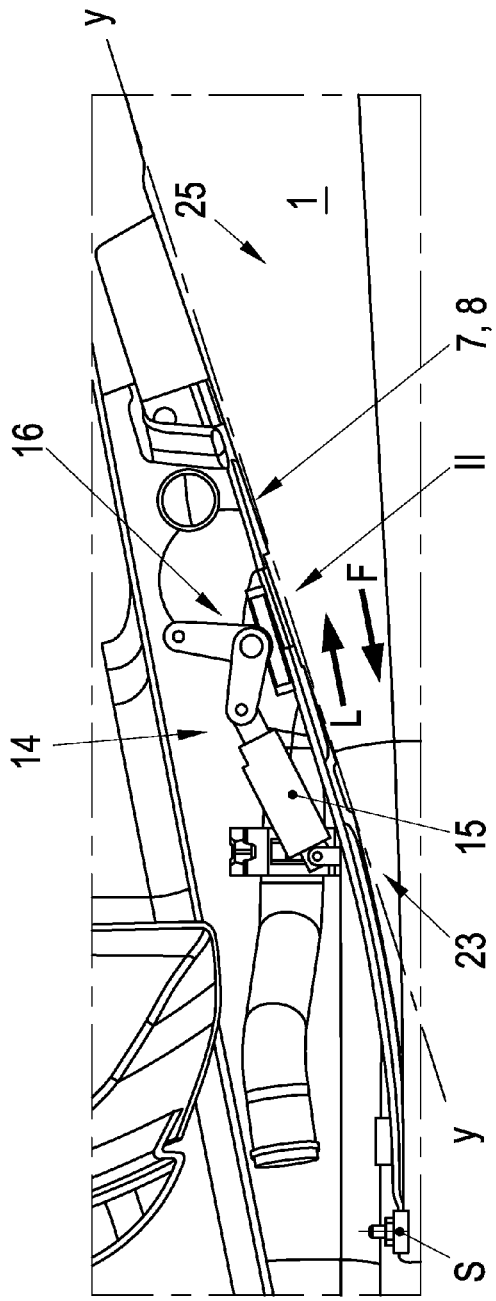
FIG. 4 is a side view of the flap of the front diffuser in an upwardly pivoted, obliquely positioned end position within an air duct in the underbody covering.

The pivotable flap 7, 8 of the front diffuser 5, 6 preferably is of thin-walled design and is made of an asbestos fiber reinforced plastics material or a carbon fiber reinforced plastics material that is bolted at a front end (as seen in the direction of travel F) to the underbody covering 1. The bolted connection 27 forms the pivot axis S for the flap 7, 8. When the flap 7, 8 is pivoted up to the position II, the first section of the flap 7, 8 starting from pivot axis S is bent in a curved manner into the oblique plane y-y, while the adjoining section B of the flap 7, 8 has a more rectilinear profile, as illustrated in FIG. 4.

The flaps 7, 8 of the front diffuser 5, 6 can be pivoted down to the lower position I to lie in the plane x-x flush with the underbody covering 1. More particularly, the flaps 7, 8 of the front diffuser 5, 6 are adjustable in the air duct 11, 12 via the pivot axis S and are arranged between the boundary walls 9, 10 of the air duct 11, 12. Therefore, the flaps 7, 8 do not increase drag.

What is claimed is:

1. A front diffuser arranged in a front underbody covering of a motor vehicle, the front diffuser comprising flaps that are arranged between two boundary walls of an air duct in the underbody covering, an actuating drive for pivoting the flaps about a transversely oriented pivot axis located at a front end of each flap, as seen in the direction of travel, so that each of the flaps is pivotable between a lower end position in the air duct where the flap runs in a horizontal plane and an upper end position where the flap is pivoted up in the air duct and runs in an oblique plane, the actuating device for each of the flaps including a linear drive having a fixed front end mounted above an upper surface of the underbody covering forward of the respective flap and a movable rear end, a toggle lever arrangement pivotable about an axis extending parallel to the pivot axis of the flap and being above the underbody covering, the toggle lever arrangement having a first lever connected to the movable end of the linear drive and a second end connected to an actuating lever that is connected pivotally to an upper surface of the respective flap at a position forward of the pivot axis.

2. The front diffuser of claim 1, wherein the actuating drive is actuable from an interior of the vehicle by an actuating switch.

3. The front diffuser of claim 1, further comprising sensors for indicating the end positions of the flaps to the driver.

4. The front diffuser of claim 1, wherein the flaps of the front diffuser are parallel to each other in the air duct in the underbody covering adjacent to a front wheel of the vehicle, and the air duct has a front inlet opening in proximity to a front spoiler and a transversely oriented outlet opening to a wheel house of the vehicle.

5. The front diffuser of claim 1, wherein the pivotable flap of the front diffuser is of thin-walled design and is formed of an asbestos fiber reinforced plastics material or a carbon fiber reinforced plastics material, the front end of the flap being connected to the underbody covering by a bolted connection to define the pivot axis, and a rear section of each of the flaps being adjustable up and down between the upper end position and the lower end position.

6. The front diffuser of claim 1, wherein the pivotable flaps of the front diffuser are flush with the underbody covering in lower end position.

7. A front diffuser arranged in a front underbody covering of a motor vehicle, the front diffuser comprising flaps that are arranged between two boundary walls of an air duct in the underbody covering, an actuating drive for pivoting the flaps about a transversely oriented pivot axis located at a front end of each flap, as seen in the direction of travel, so that each of the flaps is pivotable between a lower end position in the air duct where the flap runs in a horizontal plane and an upper end position where the flap is pivoted up in the air duct and runs in an oblique plane, the flaps of the front diffuser being parallel to each other in the air duct in the underbody covering adjacent to a front wheel of the vehicle, and the air duct having a front inlet opening in proximity to a front spoiler and a transversely oriented outlet opening to a wheel house of the vehicle, wherein the air duct is integrated in a front underbody covering of the vehicle, and has an outer boundary wall that runs rectilinearly in a longitudinal direction of the vehicle and an inner boundary wall that runs in a curved manner, one end of the outer rectilinear boundary wall forming the outlet opening of the air duct toward the wheel house.

8. The front diffuser of claim 7, wherein the actuating drive is arranged on the underbody covering and comprises a linear drive with a toggle lever arrangement activatable via an actuator.

9. The front diffuser of claim 8, wherein in the lower end position, an upright lever of the toggle lever arrangement is connected in an articulated manner to an actuating rod of the actuator, and a further, downwardly oriented lever is connected in an articulated manner to an actuating lever coupled to the flap of the front diffuser.

10. A motor vehicle comprising:
a front end;
left and right front wheels;
an underbody covering extending rearward from the front end and at least partly between the front wheels;
left and right air ducts formed above the underbody covering and having a front inlet opening in proximity to a front spoiler of the vehicle and a transversely oriented outlet opening to a wheel house for a respective one of the front wheels;
left and right flaps having front ends connected to the underbody covering at transversely oriented pivot axes and rear ends movable relative to the front ends; and
an actuating drive for pivoting the flaps about the pivot axes between a lower position where the flaps are substantially flush with the underbody covering and an upper end position where the left and right flaps extend respectively into the left and right air ducts.

11. The motor vehicle of claim 10, wherein the actuating drive is actuable from an interior of the vehicle.

12. The motor vehicle of claim 10, further comprising sensors for indicating the positions of the flaps.

13. The motor vehicle of claim 10, wherein each of the air ducts has an outer boundary wall that runs rectilinearly in a longitudinal direction of the vehicle and an inner boundary wall that curves toward the wheel house.

14. The motor vehicle of claim 10, wherein each of the pivotable flaps is formed of an asbestos fiber reinforced plastics material or a carbon fiber reinforced plastics material, the front end of each of the flaps being connected to the underbody covering by a bolted connection to define the pivot axis, and a rear section of each of the flaps being adjustable up and down.

\* \* \* \* \*